Figure 1:
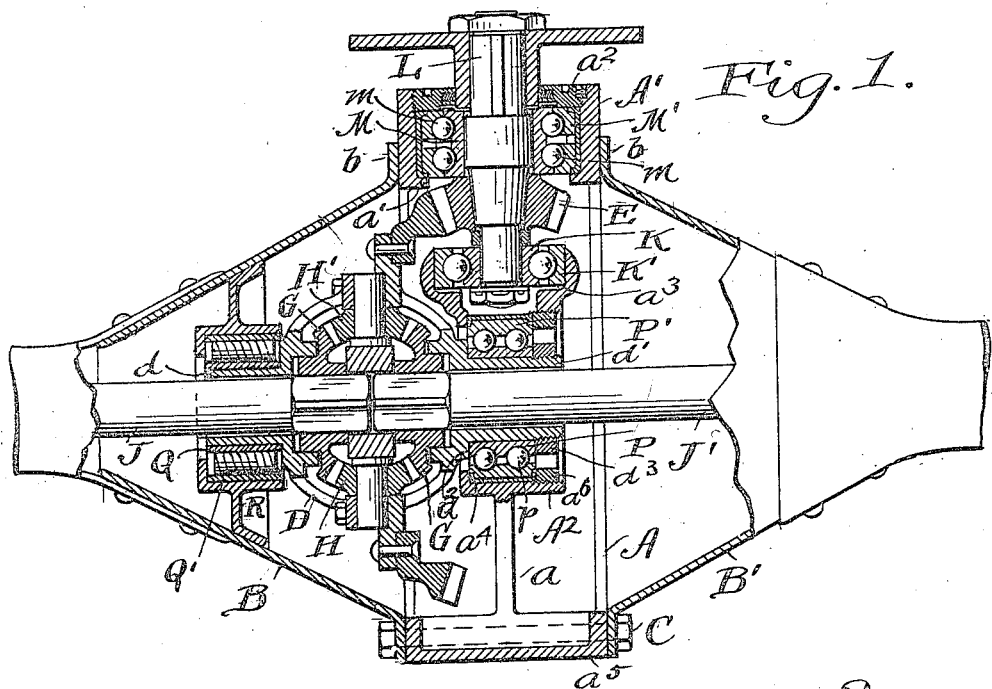

A. P. BRUSH.
REAR AXLE.
APPLICATION FILED FEB. 1, 1915.

1,168,245.

Patented Jan. 11, 1916.

Witnesses.
E. B. Gilchrist
C. V. Schurger

Inventor.
Alanson P. Brush
by Thurston & Kwis
Attorney

UNITED STATES PATENT OFFICE.

ALANSON P. BRUSH, OF DETROIT, MICHIGAN.

REAR AXLE.

1,168,245.   Specification of Letters Patent.   Patented Jan. 11, 1916.

Application filed February 1, 1915. Serial No. 5,421.

*To all whom it may concern:*

Be it known that I, ALANSON P. BRUSH, a citizen of the United States, residing at Detroit, in the county of Wayne and State of Michigan, have invented a certain new and useful Improvement in Rear Axles, of which the following is a full, clear, and exact description.

The object of this invention is to provide a relatively light, efficient and inexpensive rear axle construction for use on automobiles; and the invention consists in the construction and combination of parts shown in the drawing, and hereinafter described and definitely pointed out in the claims.

Figure 2:
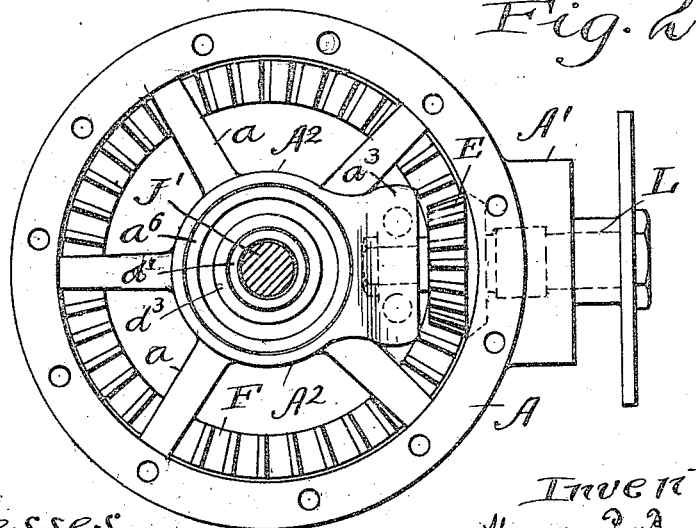

In the drawing, Figure 1 is a central horizontal section of so much of the rear axle as is required to show the invention. Fig. 2 is an end view thereof when the end member $B^1$ has been removed.

The supporting frame member of the axle is a hollow beam comprising a central member A, and two end members B, $B^1$. The central member is preferably made of an aluminum alloy, but it may be made of any other suitable metal which can be cast and machined. The two end members B, $B^1$, may be made of sheet metal of sufficient thickness to give the required strength; and each may, if desired, be built up of two or more rigidly connected pieces. Each of these end members, when completed, is outwardly flared at its inner end; and each of these flared ends is provided with a flange $b$. Bolts C which connect the three parts of the axle frame member pass through these flanges and through bosses $a^5$ formed on the central member. The central member A and the flared inner end of the member B form a housing within and by which the differential driving mechanism is supported in the manner substantially shown and to be hereinafter described.

The differential mechanism is generically of familiar form; that is to say, includes a differential drum D, having two oppositely extended alined hubs $d$, $d^1$, by means of which it is rotatably mounted. Within this drum, and mounted thereon on radial axes, are the compensating pinions H which mesh with gears G, which are co-axial with, and are rotatably mounted within the differential drum. These gears G have a driving connection with the two live axle sections J, $J^1$, which pass respectively through the hubs $d$, $d^1$, and outward through the tubular members B, $B^1$, in order that they may be connected with the driven wheels.

It has not been thought necessary to show the outer parts of the members B, $B^1$, nor the wheels, nor the manner in which the wheels are mounted or connected with these live axle sections. It is not a matter of any consequence to the present invention whether this axle is of the full floating type, which implies that the wheels are rotatably mounted on the outer ends of the tubular members B, $B^1$, or semi-floating, which implies that the live axle sections are rotatably mounted in bearings within these tubular members B, $B^1$, and project out of the same, and that the wheels are connected with such outward extensions.

The central frame member A is formed with a forwardly extending tube $A^1$, and with an integral centrally disposed sleeve $A^2$ which is connected with the outer shell of said central member by spokes $a$.

The driving shaft L projects through the tube $A^1$ and is rotatably mounted therein by means of ring bearings which are, *per se*, of a familiar form. The driving pinion E is fixed upon the driving shaft. The inner ring M of said ring bearings is fixed to the driving shaft in contact with said pinion. The outer ring $M^1$ of said ring bearings is fitted within the tube $A^1$, and is accurately positioned therein by being seated against an annular inwardly projecting flange $a^1$ formed on said tube $A^1$, and this outer ring $M^1$ is held against this flange by the screw plug $a^2$ which screws into the end of the tube A. The opposed cylindrical faces of these rings M, $M^1$, are formed with raceway grooves for the reception of anti-friction balls $m$. When, therefore, these rings are fixed, respectively, to the tube $A^1$ and the shaft L, said bearing sustains radial loads and end thrusts in both directions. Therefore, the pinion E is located and held in a definite position with respect to the various parts of the frame member A.

It will be seen that there is a second ring bearing for the driving shaft located adjacent to its inner end. The inner ring K of this bearing is fixed to the driving shaft L, while the outer ring $K^1$ is fitted into a tubular socket $a^3$ formed in the outer periphery of the sleeve $A^2$, so that this outer ring may slide in said socket lengthwise of the shaft. This bearing therefore sustains radial loads and helps to preserve the axial alinement of the shaft, but does not sustain end thrusts. It is not absolutely essential that this bearing be provided for the driving shaft.

The differential drum has its two hubs $d$, $d^1$, mounted in bearings which are different from each other although both are, *per se*, well known. One of these bearings which serves as the master bearing comprises an inner ring P which tightly fits upon the hub $d^1$ and is held to the shoulder $d^2$ thereon by the nut $d^3$. The outer ring fits within the sleeve $A^2$ and is seated against an annular flange $a^4$ and there held by a screw collar $a^6$. The opposed cylindrical surfaces of these two rings are formed with raceway grooves for the reception of anti-friction balls $p$. By accurately locating the shoulder $d^2$ with respect to the driven gear F fixed to the differential drum, and by accurately forming the flange $a^4$ with respect to the flange $a^1$, the differential drum will be positioned so that its gear F will accurately mesh with the driving pinion E. Moreover, this master bearing is formed so that it not only sustains radial loads, but it sustains end thrusts in both directions, and therefore holds the drum against any movement which would affect the mesh of said gears. It is to be noted also that this master bearing is located so that its center is substantially coincident with the intersection of the axes of the differential drum and the driving shaft; and in such position also that lines drawn through the pitch lines of the teeth of the two intermeshing gears E F will intersect at substantially the same point. It is, therefore, not essential that the bearing for the other end of the drum shall be positioned with any great precision. This other bearing is a mere steadying bearing. It is, *per se*, a roller bearing of familiar form. The inner ring Q is fixed upon the hub $d^4$, while the outer ring $Q^1$ is slidably fitted in a tubular cylindrical bracket R which is in turn fixed to the frame member B; and the rollers $q$ are in the annular space between these rings. This bearing sustains only radial loads.

It will be apparent that the only part of the frame member which requires accurate machining is the easily handled central member A; and that the parts which require machining are so related to one another that this may be accurately effected at comparatively small expense. The driving shaft L and the differential drum D may be mounted on this member while it is separated from the end members. Thereafter, it is only necessary to slip the steadying bearing endwise into the bracket R and then to fasten the end members to the central member.

It is to be noted that while this construction is one which does not require the use of means for adjusting the position of the bearings of the differential drum and driving shaft, it does not exclude the use of such adjustment devices if they are thought desirable.

Having described my invention, what I claim is:—

1. In a rear axle structure, the combination of a hollow frame having a forwardly extended tube, a driving shaft which extends through said tube, a bearing in said tube in which said driven shaft is mounted, which bearing sustains radial loads and end thrusts in both directions, a driving bevel pinion fixed to said driving shaft within said hollow frame member, a differential drum within the hollow frame member having a driven bevel gear which meshes with said pinion, two bearings for said differential drum located on opposite sides of said driven gear and supported by said hollow frame member, one of said bearings being a master bearing constructed to sustain radial loads and end thrusts and located on the same side of said driven gear as that on which said pinion lies, and the other bearing being a mere steadying bearing which sustains radial loads, but does not sustain end thrusts in either direction.

2. In a rear axle structure a hollow frame comprising a central member and two end members, all detachably connected together, said central member having an integral forwardly projecting tube and an integral internal sleeve so placed that its axis intersects the axis of said tube at right angles, a cylindrical tubular bracket within and fixed to one of said end members with its axis substantially alined with that of said sleeve, a driving shaft which extends through said forwardly projecting tube and is rotatably mounted therein, a driving bevel pinion secured to said driving shaft within the hollow frame member, a differential drum having a driven bevel gear secured to it in mesh with said driving pinion, two bearings for said differential drum located on opposite sides of said driven gear, one of said bearings being within and supported by said sleeve, and being adapted to sustain radial loads and end thrusts in both directions, and the other bearing being supported within said tubular bracket and being constructed to sustain radial loads but not to sustain end thrusts in either direction.

3. In a rear axle structure the combination of a hollow frame comprising a central member, and two end members detachably connected with said central member, said central member being formed with an integral forwardly extended tube having an inwardly projecting annular flange and with a bearing sleeve having an inwardly extended flange, which sleeve is so located that its axis intersects the axis of said tube at right angles, a driving shaft which extends through said forwardly projecting tube, a beveled driving pinion fixed to said driving shaft within the hollow frame member, ring bearings of which the inner ring is fixed upon said driven shaft and the outer ring is fitted into said tube in contact with the inwardly projecting flange thereof, means to hold said parts in contact, a differential drum having a driven gear which meshes with said driving pinion, and having also two alined hubs, one of which is provided with a shoulder, ring bearings for one of said hubs, the outer ring of which is fixed upon the shouldered hub in contact with the shoulder, and the outer ring of which is fitted in said bearing sleeve in contact with the inwardly projecting flange thereof, means for holding said contacting parts in contact, a tubular bracket fixed to one of the end members of the hollow frame and a bearing for the other hub of the differential drum supported within said tubular bracket.

4. In a rear axle structure the combination of a hollow frame comprising a central member and two end members, all detachably connected together, and said central member having an integral forwardly projecting tube, a driving shaft extended through said tube and a bearing in which said driving shaft is mounted which bearing sustains both radial loads and end thrusts in both directions, a driving bevel pinion fixed to the projecting inner end of said driving shaft, a differential drum carrying a driven bevel gear for meshing with said driving pinion and having two bearings located on opposite sides of said driven gear, one of said bearings being a master bearing which sustains radial loads and end thrusts in both directions and is supported by and within said central frame member in substantially such position that its center is coincident with the point of intersection between the axes of said driving shaft and differential drum, and the other bearing of the differential drum being a mere steadying bearing which sustains radial loads but does not sustain end thrusts in either direction.

5. In a rear axle structure the combination of a hollow frame comprising a central member and two end members, all detachably connected together, and said central member having an integral forwardly projecting tube, a driving shaft extended through said tube and a bearing in which said driving shaft is rotatably mounted which bearing sustains both radial loads and end thrusts in both directions, a driving bevel pinion fixed to the projecting inner end of said driving shaft, a differential drum carrying a driven bevel gear for meshing with said driving pinion and having two bearings located on opposite sides of said driven gear, one of said bearings being a bearing which sustains radial loads and end thrusts in both directions, which bearing is located on the same side of the driven gear as that on which the driving shaft lies, and is supported wholly by the central frame member, and the other bearing being within, and supported by, the adjacent end of one of the end members.

In testimony whereof, I hereunto affix my signature in the presence of two witnesses.

ALANSON P. BRUSH.

Witnesses:
E. L. THURSTON,
A. F. KWIS.